United States Patent
Haussecker et al.

(10) Patent No.: US 8,141,450 B2
(45) Date of Patent: Mar. 27, 2012

(54) GEAR WHEEL

(75) Inventors: Walter Haussecker, Buehlertal (DE); Max Fiedler, Buehlertal (DE); Franz Tasch, Rheinstetten (DE); Martin Krieg, Gaggenau (DE)

(73) Assignee: Robert Bosch GmbH, Stuttgart (DE)

( * ) Notice: Subject to any disclaimer, the term of this patent is extended or adjusted under 35 U.S.C. 154(b) by 808 days.

(21) Appl. No.: 12/160,382

(22) PCT Filed: Jan. 31, 2007

(86) PCT No.: PCT/EP2007/050935
§ 371 (c)(1),
(2), (4) Date: Jul. 9, 2008

(87) PCT Pub. No.: WO2007/113027
PCT Pub. Date: Oct. 11, 2007

(65) Prior Publication Data
US 2010/0224020 A1    Sep. 9, 2010

(30) Foreign Application Priority Data
Mar. 21, 2006  (DE) .......................... 10 2006 012 861

(51) Int. Cl.
*F16H 55/17*       (2006.01)
(52) U.S. Cl. ....................................... 74/434

(58) Field of Classification Search ............... 74/425, 74/431, 434, 458, 460, 461, DIG. 10
See application file for complete search history.

(56) References Cited

U.S. PATENT DOCUMENTS

| | | | |
|---|---|---|---|
| 5,267,482 A * | 12/1993 | Yoshida et al. | 74/425 |
| 6,070,484 A | 6/2000 | Sakamaki | |
| 6,591,707 B2 * | 7/2003 | Torii et al. | 74/425 |
| 2002/0014133 A1 | 2/2002 | Kimizuka | |
| 2004/0187622 A1 | 9/2004 | Noguchi et al. | |

FOREIGN PATENT DOCUMENTS

| | | |
|---|---|---|
| CN | 1034985 | 8/1989 |
| DE | 102 28 705 | 1/2004 |
| DE | 102 46 711 | 4/2004 |
| EP | 0 875 697 | 11/1998 |
| GB | 2 126 686 | 3/1984 |
| JP | 63-198861 | 8/1988 |
| JP | 8-25501 | 1/1996 |
| JP | 11325220 A * | 11/1999 |
| JP | 2006-70915 | 3/2006 |

* cited by examiner

*Primary Examiner* — Thomas R Hannon
*Assistant Examiner* — Phillip A Johnson
(74) *Attorney, Agent, or Firm* — Michael J. Striker

(57) ABSTRACT

The invention relates to a toothed wheel (1) comprising a toothed rim (2) and a toothed wheel hub (3) provided with an axial toothed wheel hub channel (19) equipped with at least one opening (20, 21) and connecting elements (11, 12, 13) for connecting the toothed wheel hub (3) and the toothed rim (2) in the radial direction and which are disposed at a distance at least in the direction of the circumference.

11 Claims, 1 Drawing Sheet

GEAR WHEEL

RELATED ART

The present invention relates to a gear wheel with a toothed ring according to the preamble of claim 1.

Gear wheels for worm gear pairs, in particular for use in adjusting devices in motor vehicles, are known from EP 0 875 697 A2 and DE 102 46 711 A1. The known gear wheels include a radial outer toothed ring that has an outer toothing and is composed of two coaxial walls. The toothed ring bears via radially extending segments distributed evenly in the circumferential direction against a gear wheel hub with two diametrically opposed openings. The segments are located on a back wall that extends around the circumference, which also connects the toothed ring and the gear wheel hub with each other. When the known gear wheel is manufactured, in particular using plastic injection-molding technology, the roundness of the gear wheel hub channel is negative influenced by the shrinkage of the radially extending segments that occurs during the cooling process. This is disadvantageous at the openings of the gear wheel hub channel in particular, since it results in the gear wheel rolling unevenly on the support bolt accommodated in the gear wheel hub channel and possibly tilting relative to the support bolt. This results in increased wear and noise.

Publication DE 102 28 705 A1 also makes known a gear wheel with a toothed ring and a gear wheel hub. As shown in FIG. 1 of DE 102 28 705 A1, the recesses with different dimensions in the radial direction are provided in the hub, the recesses extending in the axial direction and being separated in the circumferential direction by segments. With this known gear wheel as well, the shrinkage of radial segments during the cooling process also negatively affects the roundness of the gear wheel hub channel.

DISCLOSURE OF THE INVENTION

The object of the present invention is to provide a gear wheel with improved roundness in the region of at least one opening of the gear wheel hub channel.

This object is achieved via the features of claim 1.

Advantageous refinements of the present invention are indicated in the subclaims.

The present invention is based on the idea of providing an annular groove that is located adjacent to and with radial offset to at least one opening of the gear wheel hub channel, is closed in the circumferential direction, extends in the axial direction, and is narrow, in particular. Via this annular groove, the opening region of the gear wheel hub channel is decoupled from the radially extending segments, thereby preventing or at least reducing a warpage of the opening region of the gear wheel hub channel during the cooling process. As a result, the roundness of the gear wheel hub channel in the opening region is improved or increased, thereby enabling the gear wheel to roll more evenly over a support bolt, which is guided in the gear wheel hub channel. The gear wheel is also prevented from tilting on the support bolt, or the tendency for it to tilt on the support bolt is at least reduced. This results in improved engagement of the teeth with a worm that meshes with the gear wheel. Velocity fluctuations of the electric motor that drives the gear wheel are improved, which also results in a more even noise that is produced by the motor, reducing it in particular. Due to the present invention, the quality of the gear wheel hub channel in large-quantity lots is improved.

The present invention is not based only on gear wheels made of plastic using an injection-molding procedure, but also on gear wheels made of any known thermoplastic and/or duroplastic material, and on gear wheels made of metal. By providing an annular groove, the negative influence of segments that extend in the radial direction on the roundness of the gear wheel hub channel is reduced in the region of at least one opening.

Particularly good results are attained when the annular groove is symmetrical in design. In a refinement of the present invention, in particular, the annular groove is circular in shape, has a constant groove depth, and is located coaxial with the gear wheel hub channel.

To increase the stiffness of the gear wheel in the radial direction, a back wall is provided in an embodiment of the present invention that extends in the circumferential direction and connects the toothed ring and the gear wheel hub, in addition to the connection via the radially extending segments. The segments are preferably connected with the back wall and extend away therefrom in at least one axial direction. The chambers, which are bounded by the segments and the back wall, and which are separated in the circumferential direction, serve to accommodate driving elements and/or damping elements.

According to a preferred embodiment, the annular groove is formed in the back wall, in particular such that the annular groove is located—as viewed in the radial direction—between the gear wheel hub channel and the supporting region of the segments against the gear wheel hub. It may also be advantageous that the annular groove—as viewed in the radial direction—is located directly adjacent to the gear wheel hub, or—as viewed in the radial direction—extends into this region.

To ensure that the back side of the gear wheel is as flat as possible, it is advantageous when the segments—which extend in the radial direction and connect the gear wheel hub and the toothed ring with each other—are located on only one side of the back wall, i.e., when the segments extend from the back wall in only one axial direction. This is advantageous in particular when the back wall—as viewed in the axial direction—is not mounted on the gear wheel hub in the center, but rather is offset toward one side of the gear wheel, in particular toward the back side of the gear wheel.

In an embodiment of the present invention, it is provided that the annular groove is located on the back side of the back wall, facing away from the segments. Via this back side, the gear wheel typically bears against a component, in particular against a transmission housing of a worm gear pair. It is therefore important—on this side in particular—that the roundness be as exact as possible in the region of the gear wheel hub channel.

To ensure an improved and low-wear bearing of the gear wheel against a component, an annular mating surface is provided on the back side of the gear wheel that is raised in the axial direction relative to the back wall, via which the gear wheel slides along the component in the circumferential direction and is supported in the axial direction. In a refinement of the present invention it is provided that the mating surface is located radially outside of the annular groove, in particular directly adjacent to the annular groove. The mating surface preferably also extends along a radially inner region of the annular groove, i.e., along the annular region between the annular groove and the opening of the gear wheel hub channel.

To minimize losses in stability that may result due to the presence of the inventive annular groove, the groove is designed shallow relative to the axial extension of the gear wheel hub. In particular, the depth of the annular groove in the axial direction is less than the thickness of the back wall is in the axial direction.

BRIEF DESCRIPTION OF THE DRAWING

Further advantages and advantageous embodiments are depicted in the further claims, the description of the figures, and the drawing.

EMBODIMENTS OF THE INVENTION

Figure 1:
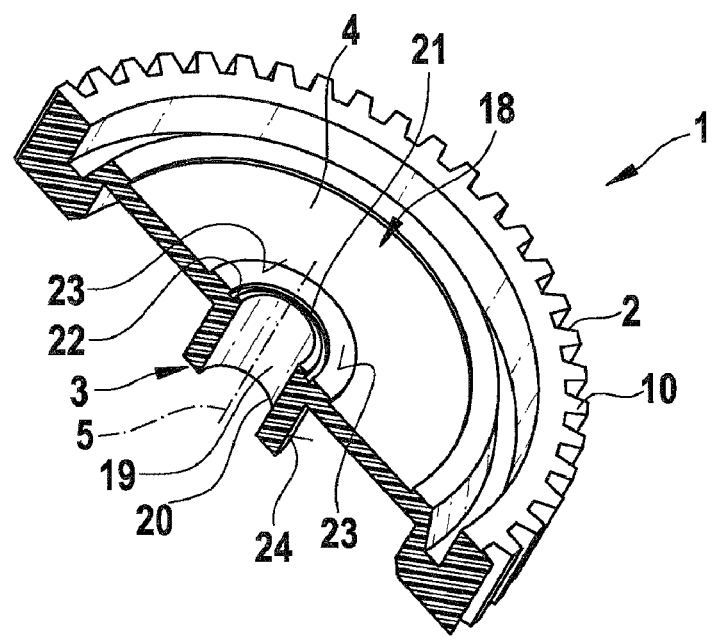
FIG. 1 shows a perspective, sectional view of a gear wheel at an angle, looking at the back side of the gear wheel.

Identical components and components with the same functionality are labelled with the same reference numerals in the figures.

Figure 2:
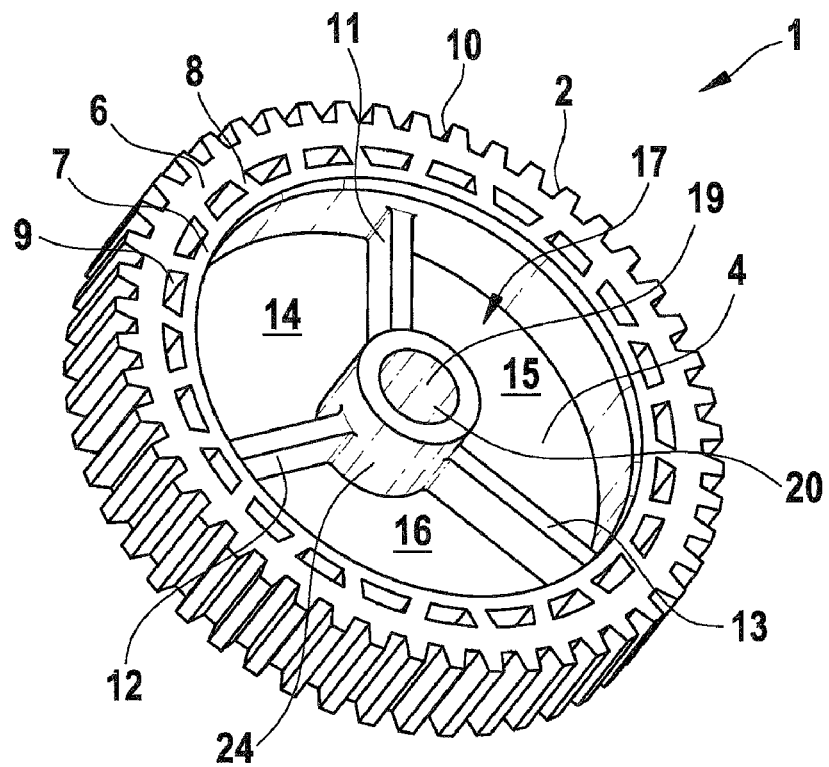
FIG. 2 shows a perspective view of a gear wheel at an angle, looking at its front side.

FIGS. 1 and 2 show a gear wheel 1 with a toothed ring 2, a central gear wheel hub 3, and a back wall 4 that connects gear wheel hub 3 with toothed ring 2 and extends in the circumferential direction. Gear wheel 1 is rotatable around a rotation axis 5.

Detailed FIG. 2 shows that toothed ring 2 is composed of two walls 6, 7, which are closed around the circumference, extend in the axial direction—that is, perpendicularly to back wall 4, and which are located coaxially to each other. Walls 6, 7 are interconnected via a large number of small segments 8, which are separated in the circumferential direction and are positioned at an angle to the radius, thereby forming honeycomb-type recesses 9 between walls 6, 7. This design of toothed ring 2 with its outer toothing 10 increases the stability of gear wheel 1, in particular of toothed ring 2, against loads that are applied from the outside in the radial direction toward the inside, due to a meshed connection with a further toothed component, in particular a worm gear. An inner toothing may be provided, e.g., in place of an outer toothing 10.

As shown in FIG. 2, toothed ring 2 and radially inner wall 7 are connected with the gear wheel hub via three radially extending segments 11, 12, 13 that are separated by 120° in the circumferential direction. As a result, toothed ring 2 bears against gear wheel hub 3 in the radial direction. The three segments 11, 12, 13 are connected with back wall 4, which is located off-center in the axial direction, and form—together with back wall 4, inner wall 7 of toothed ring 2 and the outer circumference of gear wheel hub 3—three chambers 14, 15, 16, which are equal in size and are separated in the circumferential direction, and which serve to accommodate not-shown driving elements, in particular an output shaft of an electric motor. Damping elements for damping abruptly changing drive or output torques are also typically provided in chambers 14, 15, 16.

Segments 11, 12, 13 are located only on front side 17 of back wall 4. Unlike front side 17, back side 18 of gear wheel 1—which is opposite to front side 17—is relatively flat.

The shrinkage of radially extending segments 11, 12, 13, which bear against gear wheel hub 3, negatively affects the roundness of gear wheel hub channel 19 with its two diametrically opposed openings 20, 21, which is located in the center of gear wheel hub 3.

To improve the roundness of opening 21 of gear wheel hub channel 19 provided on back side 18 of gear wheel 1, a circumferential annular groove 22 is formed in gear wheel hub 3 and back wall 4 at a slight radial distance from opening 21. Annular groove 22 is located coaxial to rotation axis 5, is circular in shape, has a constant width in the radial direction, and has a constant depth in the axial direction. Annular groove 22 is located within a mating surface 23, which extends radially on both sides of annular groove 22 in the circumferential direction in the manner of a circular ring. Mating surface 23 is raised slightly in the axial direction relative to back wall 4 and has a smooth surface.

If necessary, an annular groove may also be provided in gear wheel hub 3, around opening 20 in gear wheel hub channel 19, which is opposite to opening 21.

In the exemplary embodiment shown, annular groove 22 is located in a region—as viewed in the radial direction—between opening 21 and gear wheel hub channel 19 and outer circumferential surface 24 of gear wheel hub 3, i.e., radially within the contact region of segments 11, 12, 13 with gear wheel hub 3.

Gear wheel 1 shown is manufactured as a single piece out of plastic, in particular POM, using an injection-molding procedure. By providing—according to the present invention —the annular groove at a slight distance away from opening 21, the quality of gear wheel hub channel 19 in the region of opening 21 is improved.

What is claimed is:

1. A gear wheel (1) with a toothed ring (2) and a gear wheel hub (3) having an axial gear wheel hub channel (19) formed with at least one opening (20, 21), and with at least two segments (11, 12, 13) that are separated from each other in a circumferential direction and connect the gear wheel hub (3) with the toothed ring (2),
    wherein an annular groove (22) is provided around the opening (20, 21) at a radial distance between the gear wheel hub channel (19) and a supporting region comprising an outer surface on the gear wheel hub (3) at which the segments (11, 12, 13) are connected, wherein the toothed ring (2) and the gear wheel hub (3) are further connected by a back wall (4) integrally formed with the toothed ring (3) and the gear wheel hub (2)
    wherein the annular groove is provided at a radial distance from opening (21) within a radial width of the hub wall and
    wherein an annular mating surface (23) that is raised in the axial direction relative to the back wall (4) is provided radially outside of the annular groove (22).

2. The gear wheel as recited in claim 1, wherein the annular groove (22) is circular in shape, has a constant groove depth, and is located coaxial with the gear wheel hub channel (19).

3. The gear wheel as recited in claim 1, wherein the back wall (4) is located off-center, in the axial direction.

4. The gear wheel as recited in claim 3, wherein the annular groove (22) is formed in the back wall (4).

5. The gear wheel as recited in claim 3, wherein the segments (11, 12, 13) are located on only one side (17) of the back wall (4).

6. The gear wheel as recited in claim 5, wherein the annular groove (22) is located on the back side (18) of the back wall (4), which faces away from the segments (11, 12, 13).

7. The gear wheel as recited in claim 1, wherein the annular groove (22) is located radially between the gear wheel hub channel (19) and a supporting region comprising an outer surface on the gear wheel hub (3) at which the segments (11, 12, 13) are connected.

8. The gear wheel as recited in claim 1, wherein an annular mating surface (23) that is raised in the axial direction relative to the back wall (4) is provided radially outside of the annular groove (22).

9. The gear wheel as recited in claim 8, wherein the annular groove (22) is located within the mating surface (23).

10. The gear wheel as recited in claim 8, wherein the annular mating surface (23) is provided radially directly next to the annular groove (22).

11. A worm gear pair with a worm wheel designed as a gear wheel (1) according to claim 1.

* * * * *